(12) United States Patent
Tasaka et al.

(10) Patent No.: US 10,980,710 B2
(45) Date of Patent: Apr. 20, 2021

(54) METHOD FOR PREPARING MEDICAL/CHEMICAL SOLUTION AND MEDICAL/CHEMICAL SOLUTION PREPARATION SYSTEM

(71) Applicant: Kabushiki Kaisha Yaskawa Denki, Kitakyushu (JP)

(72) Inventors: Shigeji Tasaka, Kitakyushu (JP); Seiki Ono, Kitakyushu (JP); Makoto Umeno, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 15/222,530

(22) Filed: Jul. 28, 2016

(65) Prior Publication Data

US 2017/0043887 A1  Feb. 16, 2017

(30) Foreign Application Priority Data

Aug. 11, 2015 (JP) .............................. JP2015-159249

(51) Int. Cl.
*A61J 1/20* (2006.01)
*A61J 1/16* (2006.01)
(Continued)

(52) U.S. Cl.
CPC .............. *A61J 1/2096* (2013.01); *A61J 1/16* (2013.01); *A61J 1/165* (2013.01);
(Continued)

(58) Field of Classification Search
CPC ........ B01F 3/088; B01F 15/0237; B65B 3/26; B65B 3/28; B65B 3/30; B65B 3/003; B65B 3/006; B65B 31/02; A61J 1/2096
See application file for complete search history.

(56) References Cited

U.S. PATENT DOCUMENTS 8,522,832 B2 * 9/2013 Lopez .................. A61J 1/2096
141/9
8,596,309 B2 * 12/2013 Mizuno .................. A61J 3/002
141/104
(Continued)

FOREIGN PATENT DOCUMENTS

JP      2013-052250 A      3/2013
WO   WO 2015/041092 A1   3/2015

OTHER PUBLICATIONS

Screenshot of the cake scene from the movie "Office Space", by Mike Judge, published in Feb. 1999. The scene can be viewed on youtube under the title "Office Space—Happy Birthday Bill Lumbergh", https://www.youtube.com/watch?v=rEGdCDQrgX4.*
(Continued)

*Primary Examiner* — Andrew D Stclair
(74) *Attorney, Agent, or Firm* — Oblon, McClelland, Maier & Neustadt, L.L.P.

(57) ABSTRACT

A method is for preparing a medical/chemical solution by mixing a medical/chemical substance housed in a sealed container with a solution housed in a bag. The method includes transferring, from the bag into a syringe, an amount of the solution that is to be injected into a plurality of the containers. With the container and the syringe being held, at least one of a robot and a syringe driver configured to drive a plunger of the syringe is controlled so as to inject the amount of the solution into the plurality of the containers from the syringe.

11 Claims, 7 Drawing Sheets

(51) Int. Cl.
*B01F 15/02* (2006.01)
*B01F 15/00* (2006.01)
*B25J 9/00* (2006.01)
*B01F 13/10* (2006.01)
*B01F 11/00* (2006.01)

(52) U.S. Cl.
CPC ...... *B01F 11/0025* (2013.01); *B01F 13/1072* (2013.01); *B01F 15/00746* (2013.01); *B01F 15/0237* (2013.01); *B25J 9/0087* (2013.01)

(56) References Cited

U.S. PATENT DOCUMENTS

| | | | | |
|---|---|---|---|---|
| 9,382,021 | B2* | 7/2016 | Tribble | B65B 3/003 |
| 2006/0259195 | A1* | 11/2006 | Eliuk | A61J 1/20 |
| | | | | 700/245 |
| 2008/0092488 | A1* | 4/2008 | Gabrielsen | B65B 55/20 |
| | | | | 53/428 |
| 2009/0126825 | A1* | 5/2009 | Eliuk | B65B 3/003 |
| | | | | 141/1 |
| 2010/0241270 | A1* | 9/2010 | Eliuk | A61J 1/20 |
| | | | | 700/216 |
| 2014/0020790 | A1* | 1/2014 | Yuyama | A61J 1/20 |
| | | | | 141/27 |
| 2014/0373975 | A1 | 12/2014 | Koike et al. | |
| 2015/0210410 | A1* | 7/2015 | Umeno | A61J 1/2096 |
| | | | | 53/51 |
| 2016/0136052 | A1* | 5/2016 | Koike | A61J 1/16 |
| | | | | 141/94 |

OTHER PUBLICATIONS

Office Action dated Dec. 19, 2017 in corresponding Japanese Patent Application No. 2015-159249 (with English Translation), 12 pages.
Notice of Reason for Cancellation dated Jan. 23, 2019 in corresponding Japanese Patent Opposition No. 2018-700880; (with English-language Translation). 31 pages.

* cited by examiner

METHOD FOR PREPARING MEDICAL/CHEMICAL SOLUTION AND MEDICAL/CHEMICAL SOLUTION PREPARATION SYSTEM

CROSS-REFERENCE TO RELATED APPLICATIONS

The present application claims priority under 35 U.S.C. § 119 to Japanese Patent Application No. 2015-159249, filed Aug. 11, 2015. The contents of this application are incorporated herein by reference in their entirety.

BACKGROUND

Field of the Invention

The embodiments disclosed herein relate to a method for preparing a medical/chemical solution and to a medical/chemical solution preparation system.

Discussion of the Background

Japanese Unexamined Patent Application Publication No. 2013-52250 discloses a medical/chemical solution preparation system that mixes a medical/chemical substance housed in a sealed container with a solution housed in a bag.

SUMMARY

According to one aspect of the present disclosure, a method is for preparing a medical/chemical solution by mixing a medical/chemical substance housed in a sealed container with a solution housed in a bag. The method includes transferring, from the bag into a syringe, an amount of the solution that is to be injected into a plurality of the containers. With the container and the syringe being held, at least one of a robot and a syringe driver configured to drive a plunger of the syringe is controlled so as to inject the amount of the solution into the plurality of the containers from the syringe.

According to another aspect of the present disclosure, a method is for preparing a medical/chemical solution by mixing a medical/chemical substance housed in a sealed container with a solution housed in a bag. The method includes inserting a needle of a syringe into a plurality of the containers. The syringe contains air inside the syringe. An amount of the solution that is to be injected into a plurality of the containers is transferred from the bag into the syringe.

According to the other aspect of the present disclosure, a medical/chemical solution preparation system includes a robot, a syringe driver, and a controller. The robot includes an arm including a hand mounted on one end of the arm. The syringe driver is configured to drive a plunger of a syringe. The controller is configured to control at least one of the robot and the syringe driver to mix a medical/chemical substance housed in a sealed container with a solution housed in a bag. The controller includes a first controller and a second controller. The first controller is configured to control at least one of the robot and the syringe driver to transfer, from the bag into the syringe, an amount of the solution that is to be injected into a plurality of the containers. The second controller is configured to control at least one of the robot and the syringe driver to, with the syringe and the container being held, inject the amount of the solution into the plurality of the containers from the syringe.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Medical/Chemical Solution Preparation System

By referring to FIGS. 1 to 6, a schematic configuration of a medical/chemical solution preparation system 1 according to this embodiment will be described. For convenience of description of the medical/chemical solution preparation system 1 and other and related elements, directions indicated by "upward", "downward", "rightward", "leftward", "frontward", and "rearward" are indicated in some of FIGS. 1 to 7. It should be noted, however, that these directions may vary depending on where to install the medical/chemical solution preparation system 1 and other and related elements, and should not be construed as limiting their positions in relation to each other.

The medical/chemical solution preparation system 1 according to this embodiment mixes a medical/chemical substance 10A and a solution 10B with each other (see FIGS. 3 and 4, described later). The medical/chemical substance 10A is hermetically sealed in a container 6 (a non-limiting example of is a vial) in liquid form or powdery form. The solution 10B is hermetically sealed in a solution bag 7. Examples of the solution 10B include, but are not limited to, a saline solution and a dextrose solution.

Figure 1:
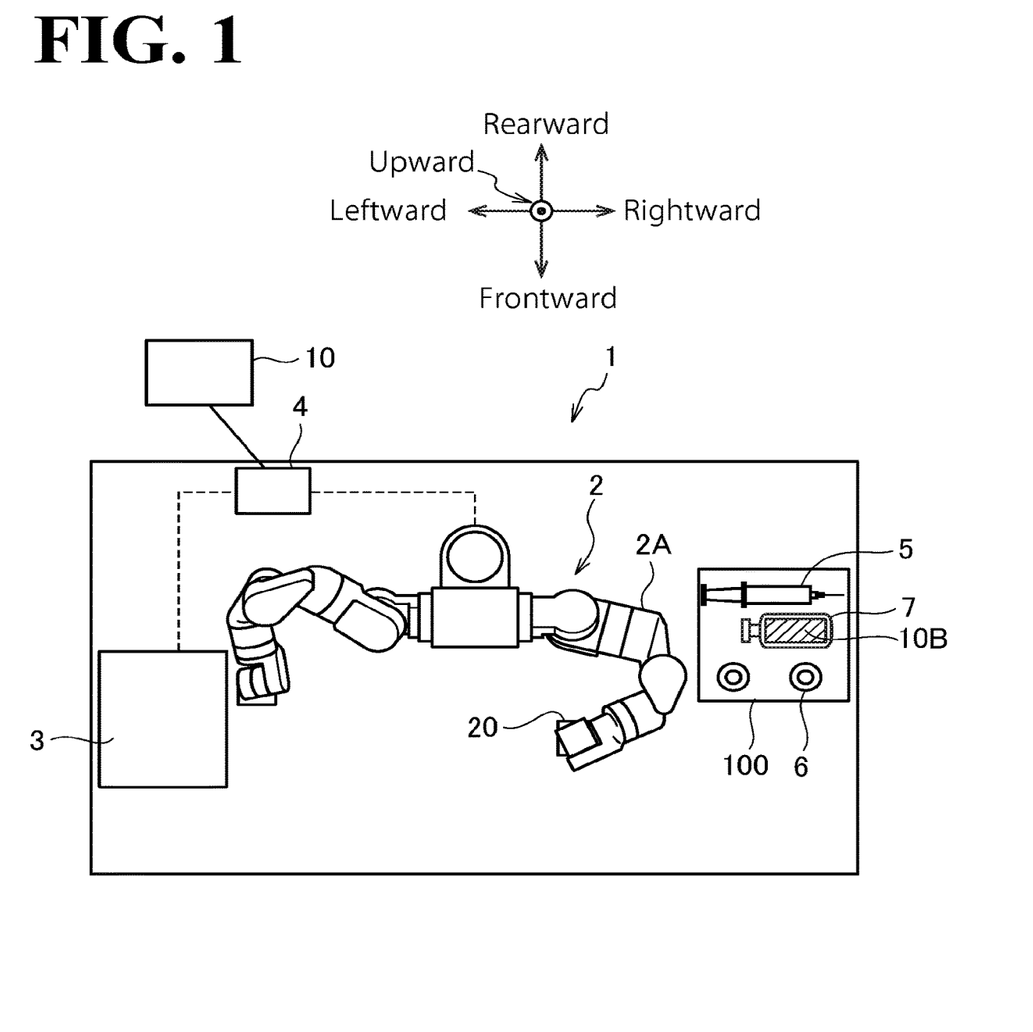
FIG. 1 is a schematic illustrating an exemplary configuration of a medical/chemical solution preparation system according to an embodiment.

As illustrated in FIG. 1, the medical/chemical solution preparation system 1 according to this embodiment includes a robot 2, a syringe driver 3, and a controller 4. Also as illustrated in FIG. 1, while the medical/chemical solution preparation system 1 according to this embodiment is not in its mixture operation, a syringe 5, the container 6, and the solution bag 7 are placed on a tray 100. Before the medical/chemical solution preparation system 1 performs its mixture operation, the container 6 may have negative pressure inside the container 6 or may not necessarily have negative pressure, as in treatment of particular substances such as GEMZAR (registered trademark).

Figure 2:
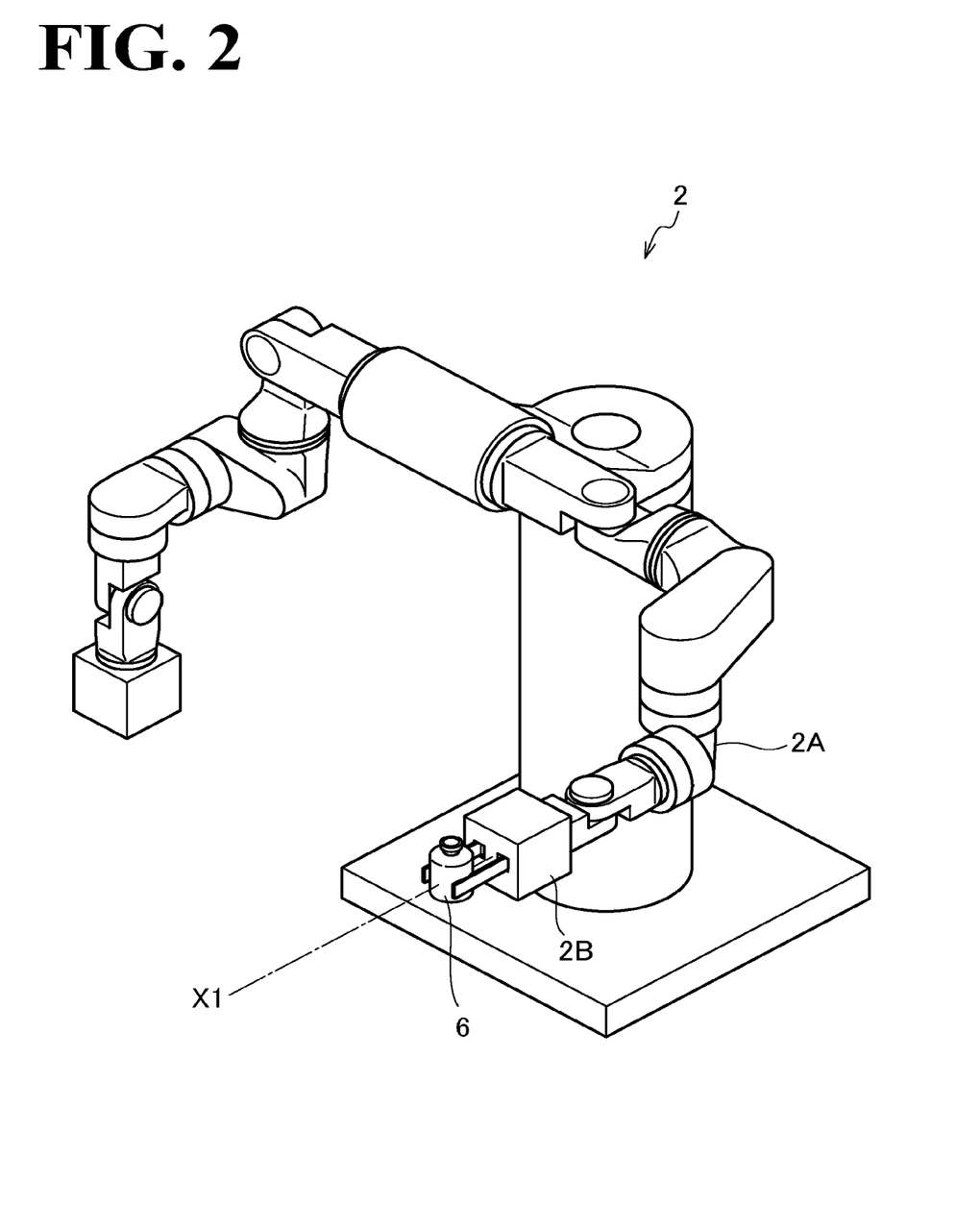
FIG. 2 illustrates an exemplary configuration of a robot according to the embodiment.

As illustrated in FIGS. 1 and 2, the robot 2 includes an arm 2A. The arm 2A is attached with a hand 2B at one end (distal end) of the arm 2A. The hand 2B is capable of holding at least one of the syringe 5, the container 6, and the bag 7. In this embodiment, the robot 2 is a two-arm robot, which is equipped with two multi-articular arms 2A.

Figure 3:
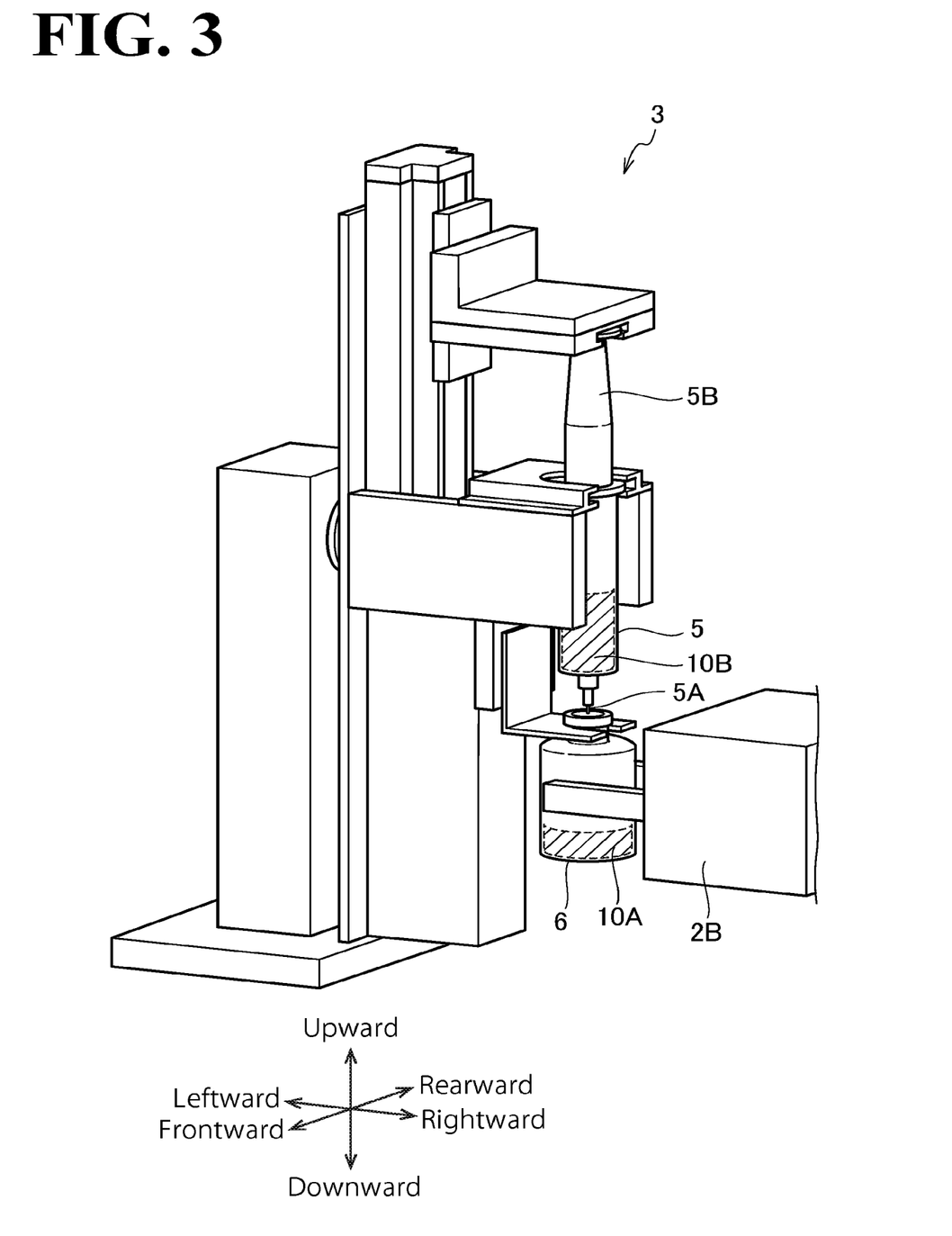
FIG. 3 illustrates an exemplary configuration of a syringe driver according to the embodiment.
Figure 4:
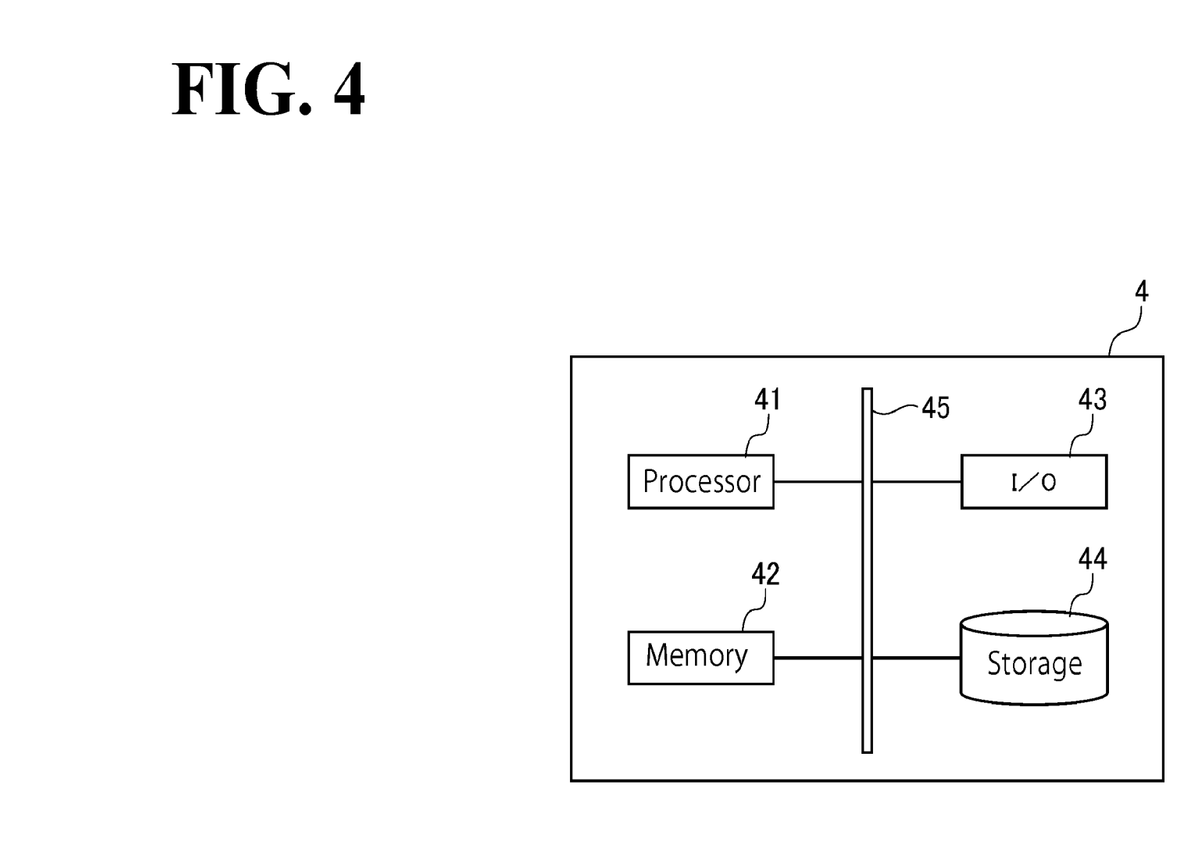
FIG. 4 is a diagram illustrating an exemplary configuration of a controller according to the embodiment.

As illustrated in FIG. 3, the syringe driver 3 is capable of holding the syringe 5 and the container 6 and driving a plunger 5B of the syringe 5.

In another possible embodiment of the medical/chemical solution preparation system 1, the syringe driver 3 may be capable of holding either the syringe 5 or the container 6. In this case, the syringe driver 3 cooperates with the robot 2 to drive the plunger 5B of the syringe 5.

In the medical/chemical solution preparation system 1 according to this embodiment, the syringe 5 includes a needle 5A and the plunger 5B. The needle 5A and the plunger 5B are used in the transfer of the solution 10B. In still another possible embodiment of the medical/chemical solution preparation system 1, the syringe 5 may come in a variety of diameters or lengths, among which a suitable syringe 5 may be selected according to the kind, volume, or any other parameter of the solution 10B to be transferred. In the embodiment illustrated in FIG. 1, one kind of syringe 5 is used for convenience of description, although two or more kinds of syringes 5 may be used.

An electronic chart system 200 manages electronic charts of patients. For example, each electronic chart includes information such as information on a medical/chemical substance(s) to be administered to a patient (medical/chemical substance information) and information on the amount of the medical/chemical substance(s) to be introduced (introduction amount information).

Figure 5:
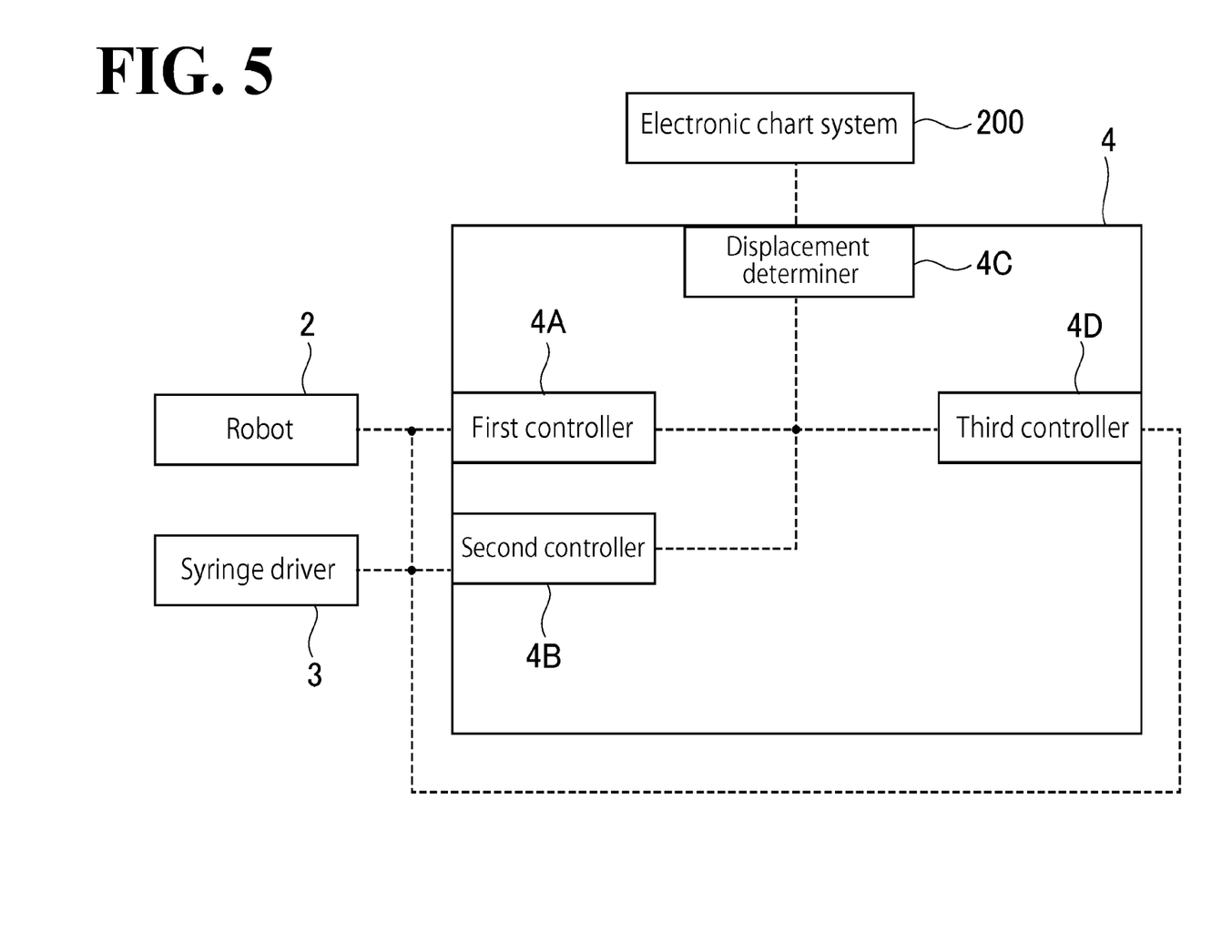
FIG. 5 is a diagram illustrating an exemplary functional configuration of the controller according to the embodiment.

As illustrated in FIG. 1, the controller 4 controls the robot 2 and the syringe driver 3. As illustrated in FIG. 4, the controller 4 includes a processor 41, a memory 42, an input/output section (I/O) 43, a storage 44, and a bus 45. The bus 45 connects these elements to each other. The processor 41 cooperates with at least one of the memory 42 and the storage 44 to execute a program, and uses a result of executing the program as a basis for inputting and outputting data through the input/output section 43. In this manner, the controller 4 implements various functions. FIG. 5 illustrates these functions in the form of imaginary blocks (hereinafter referred to as functional blocks).

As illustrated in FIG. 5, the functional blocks of the controller 4 are a first controller 4A, a second controller 4B, a displacement determiner 4C, and a third controller 4D.

The first controller 4A controls at least one of the robot 2 and the syringe driver 3 to transfer, from the bag 7 into one syringe 5, an amount of the solution 10B that is to be injected into a plurality of the containers 6.

For example, with the syringe 5 and the bag 7 secured to a predetermined table (not illustrated), the first controller 4A may control the robot 2 to pull the plunger 5B of the syringe 5 so as to transfer the solution 10B into one syringe 5 from the bag 7.

Alternatively or additionally, with both the syringe 5 and the bag 7 being held by the syringe driver 3, the first controller 4A may control the syringe driver 3 to pull the plunger 5B of the syringe 5 so as to transfer the solution 10B into one syringe 5 from the bag 7.

Alternatively or additionally, with the syringe 5 being held by the syringe driver 3 and with the bag 7 being held by the robot 2, the first controller 4A may control the syringe driver 3 to pull the plunger 5B of the syringe 5 so as to transfer the solution 10B into one syringe 5 from the bag 7.

The first controller 4A may cause to be transferred the amount of the solution 10B that is to be injected into the plurality of the containers 6, or may cause to be transferred an amount of the solution 10B that is a predetermined amount larger than the amount of the solution 10B that is to be injected into the plurality of the containers 6.

With the container 6 or the syringe 5 being held, the second controller 4B controls at least one of the robot 2 and the syringe driver 3 to inject the solution 10B into the containers 6 using the syringe 5.

For example, with the container 6 being held by the hand 2B and with syringe 5 being held by the syringe driver 3, the second controller 4B may control the robot 2 and the syringe driver 3 to perform an injection operation of pulling and pressing the plunger 5B of the syringe 5 so as to inject the solution 10B into the containers 6.

Alternatively or additionally, with both the container 6 and the syringe 5 being held by the hand 2B, the second controller 4B may control the robot 2 to perform the injection operation of pulling and pressing the plunger 5B of the syringe 5 so as to inject the solution 10B into the containers 6.

Alternatively or additionally, with both the container 6 and the syringe 5 being held by the syringe driver 3, the second controller 4B may control the syringe driver 3 to perform the injection operation of pulling and pressing the plunger 5B of the syringe 5 so as to inject the solution 10B into the containers 6.

Alternatively or additionally, with the container 6 being held by the syringe driver 3 and with the syringe 5 being held by the hand 2B, the second controller 4B may control the robot 2 and the syringe driver 3 to perform the injection operation of pulling and pressing the plunger 5B of the syringe 5 so as to inject the solution 10B into the containers 6.

This configuration reduces the number of times to transfer the solution 10B from the bag 7 into the syringe 5, and shortens the time necessary to mix the medical/chemical substance 10A and the solution 10B together. Also, the above-described configuration eliminates the need for repeatedly inserting a needle 5A of the syringe 5 into the bag 7. This, in turn, eliminates or minimizes the possibility of damage to the lid of the bag 7, and as a result, eliminates or minimizes a leakage of solution and eliminates or minimizes contamination.

The second controller 4B may control at least one of the robot 2 and the syringe driver 3 to inject the solution 10B into the plurality of the containers 6 in an order in which a container 6, among the plurality of the containers 6, into which a smaller amount of the solution 10B to be injected is prioritized. This configuration improves the accuracy of injecting the solution 10B into the plurality of the containers 6.

The second controller 4B may control at least one of the robot 2 and the syringe driver 3 to perform a plurality of injection operations of pulling and pressing the plunger 5B of the syringe 5 with respect to one container 6, so as to inject the solution 10B into the plurality of the containers 6. In each injection operation, after the plunger 5B has been pulled, the plunger 5B is pressed over the same distance as the distance over which the plunger 5B has been pulled (or pressed over a distance shorter than the distance over which the plunger 5B has been pulled), so as to inject the solution 10B into the container 6. This keeps the pressure inside the container 6 negative. Since the inside of the container 6 is kept negative, a negative-pressure-related technique can be used to inject the solution 10B into the container 6. This eliminates or minimizes a gush or leakage of (exposure to) a hazardous medical/chemical solution when the needle 5A of the syringe 5 is pulled off the container 6.

The second controller 4B controls at least one of the robot 2 and the syringe driver 3 to increase the displacement of the plunger 5B of the syringe 5 every time the injection operation is performed with respect to one container 6.

Figure 6A:
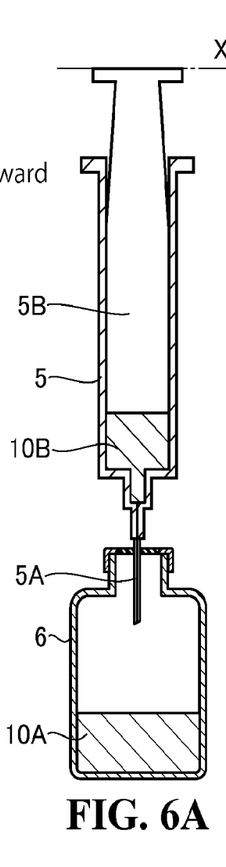
FIGS. 6A, 6B, 6C, 6D, and 6E illustrate an example of how a solution is injected from a syringe to containers in a medical/chemical solution preparation system according to the embodiment.
Figure 6B:
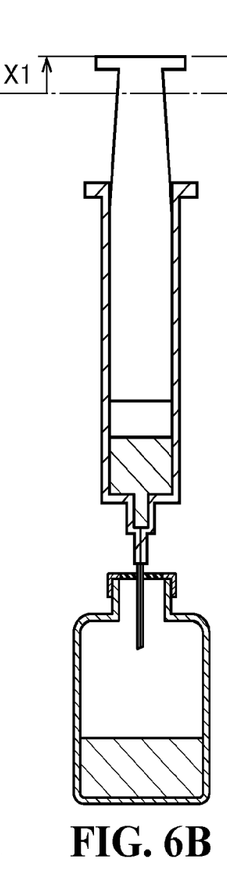
Figure 6C:
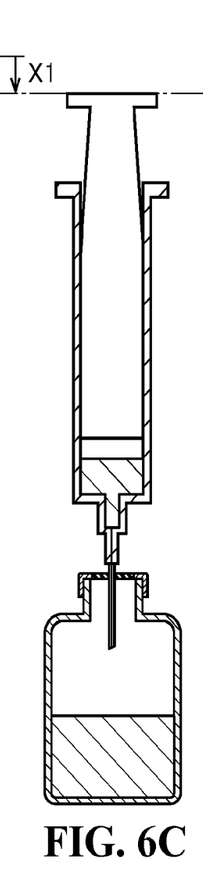
Figure 6D:
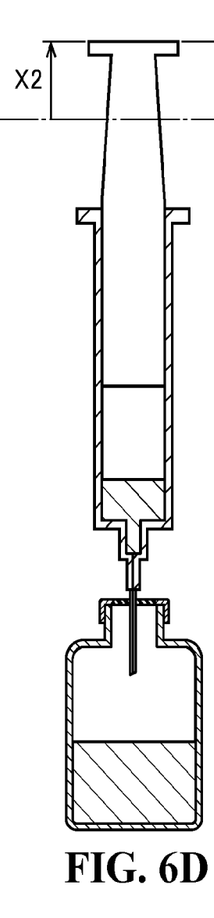
Figure 6E:
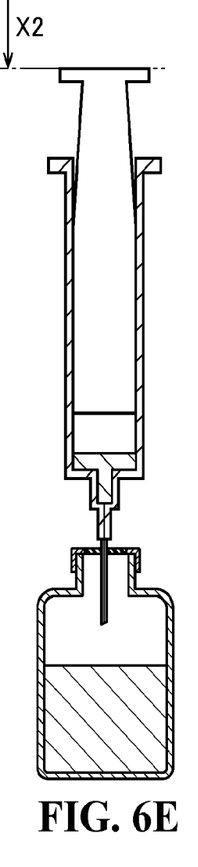

For example, as illustrated in FIGS. 6A, 6B, 6C, 6D, and 6E, with the container 6 and the syringe 5 being held (see FIG. 6A), the second controller 4B controls at least one of the robot 2 and the syringe driver 3 to (1) pull the plunger 5B by displacement X1 (see FIG. 6B), (2) press the plunger 5B by displacement X1 (or by a displacement smaller than displacement X1 by a predetermined amount) so as to inject the solution 10B into the container 6 (see FIG. 6C), (3) pull the plunger 5B by displacement X2 (see FIG. 6D), and (4) press the plunger 5B by displacement X2 (or by a displacement smaller than displacement X2 by a predetermined amount) so as to inject the solution 10B into the container 6 (see FIG. 6E). Displacement X1 is smaller than displacement X2.

By pulling the plunger 5B, air is allowed into the syringe 5, and the air effects to prevent reduction of the amount of the solution 10B injected into the container 6 by pressing the plunger 5B once. This improves accuracy of the amount of the solution 10B injected into the container 6.

Based on medical/chemical substance information and introduction amount information obtained from an electronic chart managed by the electronic chart system 200, the displacement determiner 4C determines the displacement of the plunger 5B on an every injection-operation basis. This configuration enables the plunger 5B to perform an optimal injection operation to inject a suitable amount of the solution 10B into the container 6 for the kind and introduction amount of the medical/chemical substance 10A.

Specifically, the displacement determiner 4C may determine the displacement of the plunger 5B on an every injection-operation basis based on the number of injection operations performed by the plunger 5B. The number of injection operations is related to the medical/chemical substance information and the introduction amount information included in the above-described electronic chart. This configuration enables the plunger 5B to perform an optimal injection operation to inject a suitable amount of the solution 10B into the container 6 without complicated processing. Also, the above-described configuration enables the number of injection operations performed by the plunger 5B to be identified on an individual medical/chemical substance 10A basis, and enables the displacement of the plunger 5B to be determined on an every injection-operation basis based on the identified number of injection operations. This, as a result, enables a suitable amount of the solution 10B to be injected into the container 6.

The third controller 4D controls the robot 2 to insert the needle 5A of one syringe 5 into the container 6 having negative pressure inside before the solution 10B is transferred from the bag 7 into the syringe 5 and when the syringe 5 contains air and is not fixed to the plunger 5B (that is, when the plunger 5B is freely movable relative to the syringe 5).

This configuration causes the container 6 to inevitably take in the air contained in the syringe 5 until a balance is established between the level of the kinetic (or dynamic) friction of the plunger 5B relative to the syringe 5 and the level of the negative pressure inside the container 6. This keeps the negative pressure approximately coherent throughout the plurality of the containers 6. This, as a result, improves the accuracy of injecting the solution 10B into the plurality of the containers 6.

The third controller 4D may determine whether each container 6 has negative pressure inside the container 6 based on the medical/chemical substance information and the introduction amount information obtained from the electronic chart managed by the electronic chart system 200.

Method for Preparing Medical/Chemical Solution

By referring to FIG. 7, description will be made with regard to an exemplary method for preparing a medical/chemical solution performed by the controller 4 using the robot 2 and the syringe driver 3. The method according to this embodiment for preparing a medical/chemical solution is a method for mixing the medical/chemical substance 10A and the solution 10B together. More specifically, the method according to this embodiment for preparing a medical/chemical solution includes injecting the solution 10B into the plurality of the containers 6 with the medical/chemical substance 10A sealed in each container 6, so as to mix the medical/chemical substance 10A and the solution 10B together.

Figure 7:
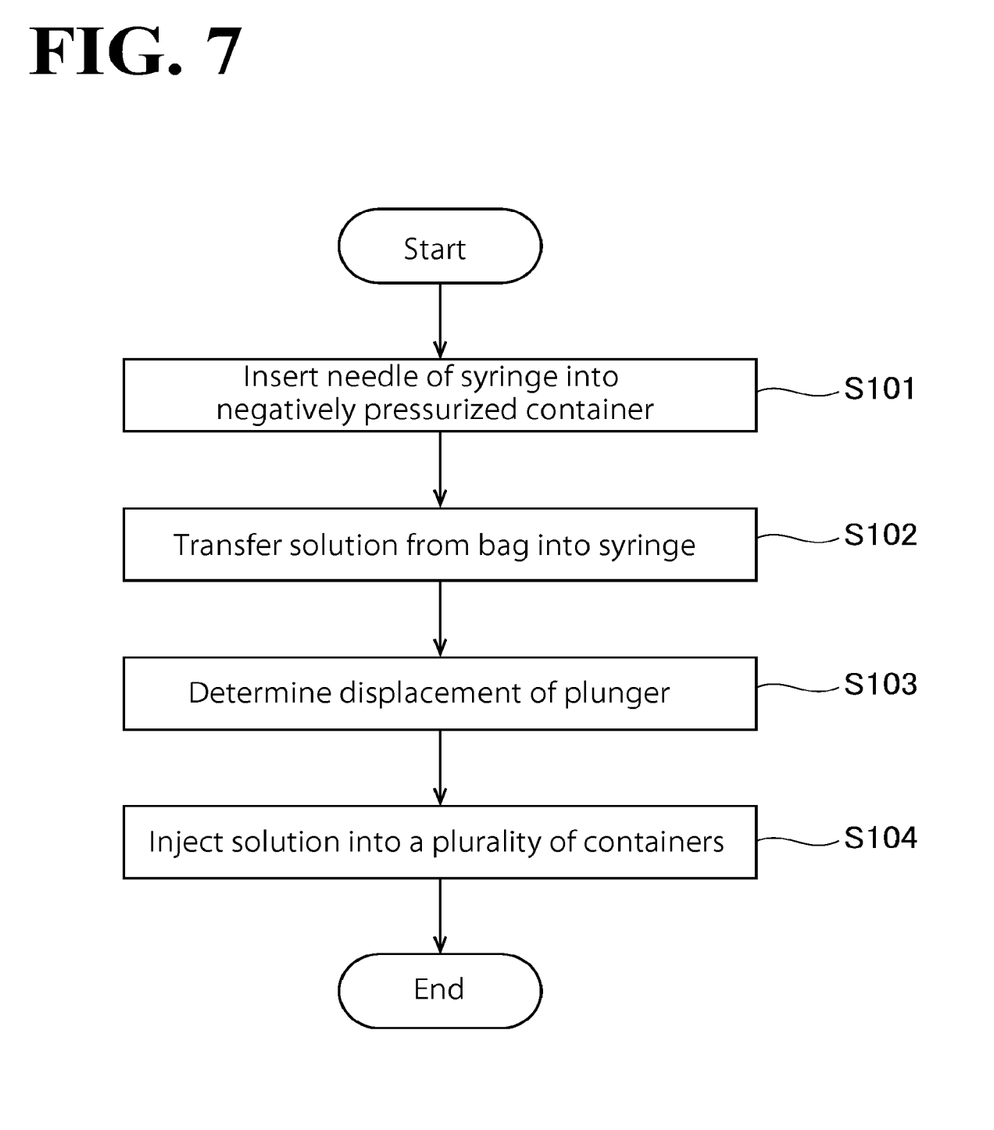
FIG. 7 is a flowchart of an exemplary method according to the embodiment for preparing a medical/chemical solution.

As illustrated in FIG. 7, at step S101, the controller 4 controls the robot 2 to insert the needle 5A of the syringe 5 into the container 6 having negative pressure inside the container 6. Specifically, the controller 4 controls the robot 2 not to insert the needle 5A of the syringe 5 into the container 6 if the container 6 does not have negative pressure inside the container 6.

At step S102, the controller 4 controls at least one of the robot 2 and the syringe driver 3 to transfer, from the bag 7 into the syringe 5, an amount of the solution 10B that is to be injected into the plurality of the containers 6.

At step S103, the controller 4 determines the displacement of the plunger 5B on an every injection-operation basis. For example, the controller 4 may determine the displacement of the plunger 5B on an every injection-operation basis based on the medical/chemical substance information and the introduction amount information obtained from the electronic chart.

At step S104, the controller 4 controls at least one of the robot 2 and the syringe driver 3 to perform the injection operation of the plunger 5 of the syringe 5 so as to inject the solution 10B into the plurality of the containers 6.

The medical/chemical solution preparation system 1 according to this embodiment and the method according to this embodiment for preparing a medical/chemical solution shorten the time necessary to mix the medical/chemical substance 10A and the solution 10B together.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A method for preparing a medical/chemical solution, comprising:
setting, in a medical/chemical solution preparation system, a syringe, a bag containing a solution, and a plurality of sealed containers housing a medical/chemical substance such that the medical/chemical solution preparation system includes a syringe driver configured to drive a plunger of the syringe, and a robot comprising an arm and a hand mounted on one end of the arm;
pulling the plunger of the syringe a first time using at least one of the syringe driver and the robot in the medical/ chemical solution preparation system such that an amount of a solution to be injected into the plurality of sealed containers is transferred from the bag containing the solution into the syringe;

performing a plurality of injection operations such that at least one of the plurality of injection operations includes:

inserting a needle of the syringe into one of the plurality of sealed containers, using at least one of the syringe driver and the robot, when the one of the plurality of sealed containers has a negative pressure inside the one of the plurality of sealed containers,     pulling the plunger a second time using at least one of the syringe driver and the robot, while the needle of the syringe is inserted in one of the plurality of sealed containers, and     pressing the plunger of the syringe after the pulling of the plunger the second time, using at least one of the robot and the syringe driver in the medical/chemical solution preparation system, such that the amount of the solution is injected into the one of the plurality of sealed containers from the syringe, the plurality of injection operations being performed in an order in which the plurality of sealed containers is prioritized for a smaller amount of the solution to be injected in the injection operations; and controlling at least one of the syringe driver and the robot not to insert the needle into the one of the plurality of sealed containers, when the one of the plurality of sealed containers does not have a negative pressure.

2. The method according to claim 1, further comprising:
determining a displacement of the plunger in each of the plurality of injection operations.

3. The method according to claim 2, wherein the displacement of the plunger in each of the injection operations is determined based on medical/chemical substance information and introduction amount information obtained from an electronic chart.

4. The method according to claim 2, wherein the determining is performed based on a number of the injection operations performed, and the number is related to the medical/chemical substance information and the introduction amount information.

5. The method according to claim 2, wherein the plurality of injection operations include increasing a displacement of the plunger every time one injection operation of the injection operations is performed.

6. The method according to claim 5, wherein the displacement of the plunger in each of the injection operations is determined based on medical/chemical substance information and introduction amount information obtained from an electronic chart.

7. The method according to claim 5, wherein the determining is performed based on a number of the injection operations performed, and the number is related to the medical/chemical substance information and the introduction amount information.

8. The method according to claim 1, wherein the plurality of injection operations include increasing a displacement of the plunger every time one injection operation of the plurality of injection operations is performed.

9. The method according to claim 8, wherein the displacement of the plunger in each of the injection operations is determined based on medical/chemical substance information and introduction amount information obtained from an electronic chart.

10. The method according to claim 1,
wherein when the one of the plurality of sealed containers has the negative pressure inside the one of the plurality of sealed containers, the syringe contains air and is not fixed to the plunger.

11. A medical/chemical solution preparation system, comprising:

a robot comprising an arm and a hand mounted on one end of the arm;

a syringe driver configured to drive a plunger of a syringe; and a controller comprising circuitry configured to control at least one of the robot and the syringe driver to:

pull the plunger of the syringe a first time such that an amount of a solution to be injected into a plurality of sealed containers is transferred from a bag containing the solution into the syringe, and     perform a plurality of injection operations such that in at least one of the plurality of injection operations the circuitry is configured to control at least one of the robot and the syringe driver to:

insert a needle of the syringe into one of the plurality of sealed containers, using at least one of the syringe driver and the robot, when the one of the plurality of sealed containers has a negative pressure inside the one of the plurality of sealed containers,         pull the plunger a second time using at least one of the syringe driver and the robot, while the needle of the syringe is inserted in one of the plurality of sealed containers, and         press the plunger of the syringe after the pulling of the plunger the second time, using at least one of the robot and the syringe driver in the medical/chemical solution preparation system, such that the amount of the solution is injected into the one of the plurality of sealed containers from the syringe, wherein the plurality of injection operations are performed in an order in which the plurality of sealed containers is prioritized for a smaller amount of the solution to be injected in the injection operations, and wherein the circuitry is configured to control at least one of the syringe driver and the robot not to insert the needle into the one of the plurality of sealed containers, when the one of the plurality of sealed containers does not have a negative pressure.

\* \* \* \* \*